United States Patent
Haimer

(10) Patent No.: US 7,968,830 B2
(45) Date of Patent: Jun. 28, 2011

(54) ATTENTUATING ADAPTOR FOR AN INDUCTIVE SHRINKAGE APPLIANCE

(75) Inventor: Franz Haimer, Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 734 days.

(21) Appl. No.: 11/587,244

(22) PCT Filed: Apr. 21, 2005

(86) PCT No.: PCT/EP2005/004304
§ 371 (c)(1),
(2), (4) Date: Oct. 23, 2006

(87) PCT Pub. No.: WO2005/102595
PCT Pub. Date: Nov. 3, 2005

(65) Prior Publication Data
US 2007/0187393 A1    Aug. 16, 2007

(30) Foreign Application Priority Data
Apr. 23, 2004   (DE) .......................... 10 2004 019 867

(51) Int. Cl.
*H05B 6/10* (2006.01)
(52) U.S. Cl. ............... 219/635; 219/637; 219/643
(58) Field of Classification Search .............. 219/644, 219/676, 635, 632, 642, 607, 629, 643, 637, 219/640, 602, 639; 29/407; 156/85
See application file for complete search history.

(56) References Cited

U.S. PATENT DOCUMENTS
6,354,179 B1 * 3/2002 Leuze ........................ 82/160
2001/0054471 A1 * 12/2001 Kelch ........................ 156/85

FOREIGN PATENT DOCUMENTS
JP    2001129728 A  *  5/2001
JP    2003-181709 A     7/2003
JP    2003181709 A  *  7/2003
TW       535680        6/2003

OTHER PUBLICATIONS
Taiwan IPO Search Report dated Sep. 19, 2010.

\* cited by examiner

*Primary Examiner* — Quang T Van
*Assistant Examiner* — Hung Nguyen
(74) *Attorney, Agent, or Firm* — Scott D. Wofsy; Edwards Angell Palmer & Dodge LLP

(57) ABSTRACT

An attenuating adaptor is proposed in the form of a sleeve (23) which is composed of non-ferromagnetic metal for insertion radially during operation between a holding section (11) (which is provided with a central holding opening (15) for holding a tool shank with a press fit) of a tool holder (1) and an induction coil arrangement (19) (which concentrically surrounds the holding section (11) in order to widen it thermally) of a shrinkage appliance (5) which feeds alternating current to the induction coil arrangement (19). The sleeve (23) can be provided with slots which pass through its wall and whose number, axial length and circumferential width influence the attenuating characteristics of the sleeve (23). Sleeves (23) of different sizes are provided for a set of different tool holders (1), and their attenuating characteristics are chosen such that all of the tool holders (1) in this set can be shrunk using one and the same setting of the shrinkage appliance (5).

9 Claims, 1 Drawing Sheet

ATTENUATING ADAPTOR FOR AN INDUCTIVE SHRINKAGE APPLIANCE

The invention relates to an attenuating adaptor for an inductive shrinkage appliance, and to a set of such attenuating adaptors.

From WO 01/89758 A1, it is known for rotating tools, for example drills or milling cutters or the like, to be shrunk by means of a shrinkage appliance into a central holding opening in a tool holder. The holding opening is provided in a holding section (which is in the form of a sleeve) of the tool holder and has a nominal diameter which is somewhat smaller than the diameter of the tool shank to be inserted into the holding opening. The holding section can be thermally widened by means of an induction coil arrangement which concentrically surrounds the holding section during operation, so that the tool shank can be inserted into the holding opening, and can be removed from it again. After cooling down, the holding section holds the tool shank shrunk in in a rotationally fixed manner, with a press fit.

The shrinkage appliance feeds high-frequency alternating current or pulsed direct current to the induction coil arrangement, with the current level and/or the frequency and/or the time for which it is applied being preset by a controller in order on the one hand to ensure adequate heating of the holding section, but on the other hand to prevent undesirable overheating.

This power supply data must normally be set on the shrinkage appliance as a function of the type of tool holder to be heated. Where it is intended to insert and remove tool shanks with diameters of different size, the parameters to be set on the shrinkage appliance are comparatively non-critical, so that tool holders from a predetermined size range can also be thermally widened using one and the same setting. In contrast, tool holders with a relatively thin-walled holding section are critical, such as those which are intended, in particular, for clamping tool shanks with a diameter of only a few millimeters, for example three to six millimeters. The energy setting parameters for the shrinkage appliance must be complied with exactly for tool holders such as these with a thin-walled holding section. Furthermore, with tool holders such as these, their size dimensions differ only slightly so that the type designations applied to the tool holders must be observed exactly. This makes shrinkage operation more difficult, particularly when tool holders of different size are intended to be shrunk successively.

One object of the invention is to indicate a way to allow the risk of overheating of sensitive tool holders, in particular of tool holders with a thin-walled holding section, to be reduced.

In order to achieve this object, an attenuating adaptor is proposed in the form of a sleeve which is composed of non-ferromagnetic metal for loose insertion radially during operation between a holding section (which is provided with a central holding opening for holding a tool shank with a press fit) of a tool holder and an induction coil arrangement (which concentrically surrounds the holding section in order to widen it thermally) of a shrinkage appliance which feeds alternating current to the induction coil arrangement.

Normally, the power of the shrinkage appliance is designed to be sufficiently great that it is able to sufficiently quickly inductively heat tool holders for tool shanks with diameters of up to several 10s of millimeters, for example up to 50 millimeters, in order not only to clamp the tool shank but also to allow it to be removed from the tool holder again. It has been found that, with a sleeve which is composed of non-ferromagnetic metal and is thus magnetically impermeable, the magnetic flux in the holding section, which is normally composed of ferromagnetic material, such as steel, of the tool holder can be attenuated sufficiently to make it possible to avoid undesirable overheating of the holding section, even if the energy parameters of the shrinkage appliance have not been adapted exactly. Since the sleeve is composed of metal, eddy currents are induced in it which weaken the magnetic flux in the holding section. The sleeve is preferably in this case located with its inner circumferential surface at least on a subarea of its axial length in flat touching contact with the outer circumferential surface of the holding section, so that, to a certain extent, it dissipates the heat from the holding section. It has been found that the eddy current heating of the sleeve is less than the eddy current heating of the ferromagnetic holding section, which carries the majority of the magnetic flux, of the tool holder. The inner circumferential casing of the sleeve is expediently conical, corresponding to the shape of the holding section, which is normally likewise conical, at least in the area of the flat touching contact.

In order to make it possible to fit the sleeve reproducibly in the same position on the holding section of the tool holder, the sleeve preferably has a stop which projects radially inwards at its axial end adjacent to the insertion side of the tool shank, by means of which stop the sleeve can be positioned axially on one end surface of the holding section. Not least, the induction coil arrangement can then itself be axially positioned with a similar axial stop on the sleeve which has been axially positioned in this way, in order to achieve reproducible induction conditions.

The sleeve is expediently composed of copper, aluminum or of an alloy of one of these metals, in order to achieve adequate thermal conductivity characteristics.

The attenuating characteristics of the sleeve may vary in many ways. On the one hand, the wall thickness of the sleeve may be varied. However, the sleeve preferably has at least one slot which passes radially through the sleeve and extends essentially axially over at least a part of the axial length of the sleeve. The slot opens the wall of the sleeve for the magnetic flux, so that the attenuation of the magnetic flux can be controlled over the axial length of the slot and of its width in the circumferential direction. The length and width of the slot furthermore limits the contact area in which the sleeve makes a touching contact with the holding section of the tool holder, and thus the cooling influence which the sleeve has on the holding section.

In order to allow the contact area (which transmits heat) between the sleeve and the holding section to be varied even better, the sleeve is preferably provided with an annular cut-out in at least one axial subsection on its inner circumferential surface. Since the sleeve is slotted, it has radially elastic characteristics and can therefore better match the circumference of the holding section, thus improving the heat transmission characteristics.

In order to distribute the attenuation characteristics of the sleeve uniformly over the circumference of the holding section, the sleeve preferably has two or more slots arranged distributed at equal angular intervals in the circumferential direction. The slots are preferably arranged diametrically opposite in pairs in the circumferential direction, in particular in such a way that the slots pass through the sleeve alternately in the circumferential direction starting from axially opposite ends of the sleeve, over a part of its axial length. Slots such as these produce a sleeve with a meandering circumferential structure, which can be matched particularly well to the external circumference of the holding section.

In order to allow the holding section of the tool holder to be cooled down again as quickly as possible after being thermally heated, it is known for a cooling collar to be fitted to the holding section. The cooling collar may be a simple, air-cooled heat sink with cooling ribs. However, as is known in detail from WO 01/89758 A1, the cooling collar may also be connected to a liquid cooling circuit. In one preferred refinement, the outer circumferential surface of the sleeve is conical and thus allows the cooling collar to be fitted.

A second aspect of the invention relates to an adaptor set which has two or more of the attenuating adaptors as explained above and is associated with a set of different tool holders. The sleeves for an adaptor set such as this are designed with the holding section having external contours which differ from one another, and/or with the holding openings having different internal diameters from one another for fitting onto the holding section of tool holders, and such that the holding sections of the tool holders (which are provided with the associated sleeves) can be thermally widened with the same alternating current feed setting of the shrinkage appliance in each case. All of the tool holders associated with the set can be thermally widened using one and the same energy parameter setting of the shrinkage appliance, since the attenuating and cooling characteristics of the sleeves are designed such that the magnetic flux in the holding section complies with the predetermined limits for the individual tool holders. For this purpose, the wall thicknesses of the sleeves and/or the number of the slots and/or the axial lengths of the slots and/or the widths of the slots in the circumferential direction of the sleeve and/or the dimensions of the annular cutouts which are provided in the inner circumferential surfaces of the sleeves are chosen such that the holding sections of the tool holders (which are provided with the associated sleeves) can be thermally widened adequately, but without any overheating. The dimension parameters explained above can in this case be determined empirically by a small number of trials.

In this case, all of the sleeves in the set expediently have outer circumferential surfaces with the same contour and with the same diameter, so that one and the same cooling collar can also be used for cooling the thermally widened tool holders.

The invention will be explained in more detail in the following text with reference to a drawing, in which.

Figure 1:
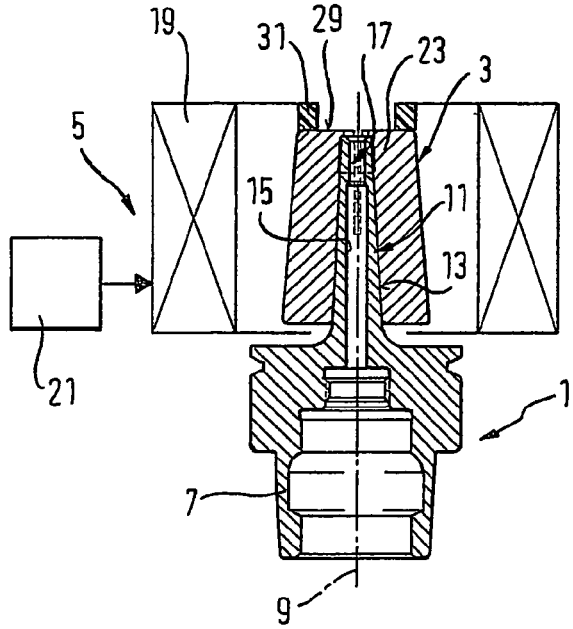
FIG. 1 shows a tool holder of the shrinkage type, with an attenuating adaptor fitted in a shrinkage appliance.

FIG. 1 shows a tool holder 1 with an attenuating adaptor 3, which is associated with it and will be explained in more detail in the following text, in a shrinkage operating position of a shrinkage appliance, which is generally annotated 5. A shrinkage appliance such as this is described in detail, for example, in WO 01/89758 A1.

The tool holder 1 has a standardized coupling section 7 by means of which it can be coupled in a rotationally fixed and axially positioned manner to the rotating spindle of a machine tool and, centrally with respect to its axis of rotation 9, has a holding section 11 which is in the form of a sleeve and has a conical, outer circumferential surface 13 and a central holding opening 15, whose diameter in a clamping area 17, which is intended for holding the shank of a rotating tool (which is not illustrated in any more detail), for example of a drill or of a milling cutter, is somewhat smaller than the diameter of the tool shank.

The holding section 11 of the tool holder 1 is composed of ferromagnetic material, for example heat-resistant steel, so that it concentrates the magnetic flux from an induction coil arrangement 19, which coaxially surrounds the holding section 11 for shrinkage operation, when the induction coil arrangement 19 is fed with a high-frequency alternating current at a selectable level from an AC generator 21. The magnetic flux induces eddy currents in the holding section 11, which heat the holding section 11 and thus thermally widen the holding opening 15 to an internal diameter which is larger than the diameter of the tool shank. The tool shank can be inserted into the widened holding opening 15, or can be removed from it. Once the holding section 11 has cooled down, the tool shank which has been inserted into the holding opening 15 is held firmly, with a press fit.

The level of the alternating current which is produced by the generator 21, the time interval in which the alternating current is fed to the induction coil arrangement 19, and, if appropriate, the frequency of the alternating current determine the amount of induction energy supplied to the holding section 11, and thus the rate at which the holding section 11 is widened, as well as the temperature of the holding section 11 and thus the widened diameter of the holding opening 15 that is achieved. Particularly in the case of a thin-walled holding section 11, as is shown in FIG. 1, the above parameters must be complied with exactly in order on the one hand to widen the holding opening 15 sufficiently, and on the other hand to avoid overheating of the holding section 11, which can lead to destruction of the tool holder 1. In the case of conventional shrinkage appliances, the parameters must therefore be individually matched to the respective type of tool holder 1, to be precise even for tool holders whose holding section and holding opening dimensions differ only slightly. Particularly when different tool holders from a set of similar tool holders are intended to be shrunk successively, the setting of the shrinkage appliance requires increased care. In order to simplify operation of the shrinkage appliance in a situation such as this, each of the tool holders 1 in the set has a separate associated attenuating adaptor 3, according to the invention, whose attenuating characteristics are designed in the manner which will be explained in more detail in the following text, such that all of the tool holders 1 in the set can be inductively heated using one and the same energy setting for the shrinkage appliance 5, when using the respectively associated attenuating adaptor 3. The attenuating adaptor 3 adjusts the magnetic flux that acts on the holding section 11 such that, on the one hand, the holding opening 15 is sufficiently widened and, on the other hand, overheating of the holding section 11 is avoided.

The attenuating adaptor 3 is generally in the form of a sleeve 23, and is composed of a non-ferromagnetic metal, that is to say a magnetically impermeable metal, such as copper or preferably aluminum or an alloy of one of these metals. As can be seen best in FIGS. 3 and 4, the inner circumferential surface 25 of the sleeve 23 has a conical shape, which is matched to the conical surface 13 of the holding section 11 for a flat touching contact. Adjacent to the tool insertion end of the holding section 11, the sleeve 23 has, at its corresponding axial end, stop tabs 27, which project radially inwards, axially position the sleeve 23 at the axial end of the holding section 11, and ensure a defined position of the sleeve 23 relative to the holding section 11. The end 29 which is adjacent to the stop tabs 27, as shown schematically in FIG. 1, allows the axial position of the induction coil arrangement 19 relative to the holding section 11 via a stop 31 on the coil side.

The circumferential wall of the sleeve 23 has two or more slots 33, in this case eight slots 33, which are distributed uniformly in the circumferential direction and pass radially through the sleeve 23, but which extend in the axial direction only over a subsection of the axial length of the sleeve 23. In the illustrated exemplary embodiment, the slots 33 are each diametrically opposite one another in pairs, with slots 33 which are adjacent in the circumferential direction each originating from different axial end surfaces of the sleeve 23, but which do not reach the respective other end surface. Thus, overall, the sleeve 23 has a meandering, radially elastic wall structure, which allows it to be elastically matched to the area of the outer circumferential surface 13 of the holding section 11.

Figure 3:
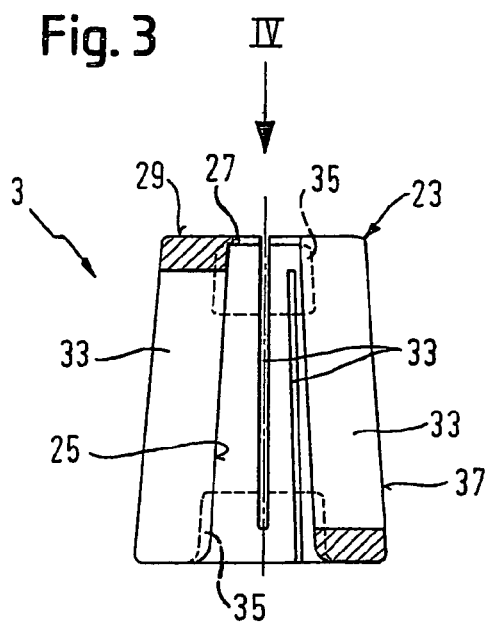
FIG. 3 shows an axial longitudinal section through an attenuating adaptor, seen along a line III-III in FIG. 4.
Figure 4:
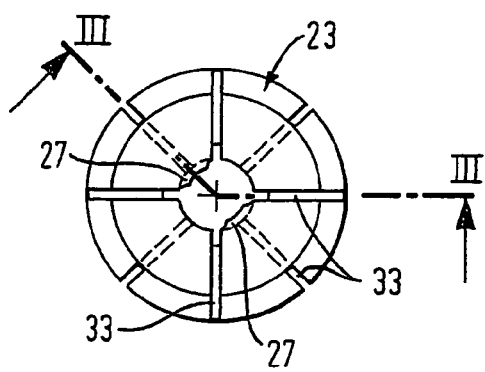
FIG. 4 shows a plan view of the attenuating adaptor, seen in the direction of an arrow IV in FIG. 3.

The attenuating behavior of the attenuating adaptor 3 is governed by the wall thickness of the sleeve 23, by the number, the axial length and the width of the slots 33 in the circumferential direction and, if appropriate, by annular cutouts in the inner circumferential surface 25, as are indicated in the area of the axial ends of the sleeve 23, at 35, in FIG. 3. The attenuating adapters 3 which are associated with the individual tool holders 1 in the set can be designed by suitable choice of these dimension parameters such that the shrinkage process can be carried out for all of the tool holders 1 in the set using one and the same setting for the parameters which govern the energy for the shrinkage appliance 5.

Figure 2:
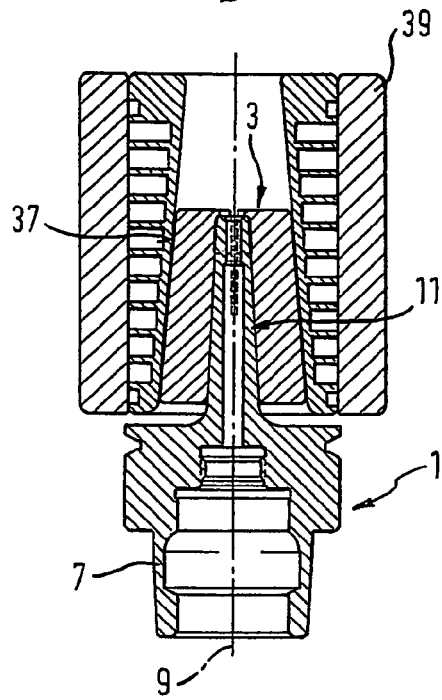
FIG. 2 shows the tool holder with the attenuating adaptor fitted, and with a cooling collar an attenuating adaptor fitted, and with a cooling collar fitted.

All of the attenuating adaptors 3 in the set have a conical outer circumferential surface 37 with the same dimensions and the same cone angle within the set, so that one and the same cooling collar 39 can be fitted as standard to the attenuating adaptor, which is still seated on the holding section 11 from the shrinkage process, for all of the tool holders 1 in the set, for cooling of the thermally widened tool holder 1 (FIG. 2). In the illustrated exemplary embodiment, the cooling collar 39 is in the form of a collar which can be connected to a liquid circuit, as is explained in detail in WO 01/89758 A1. Air-cooled heat sinks can likewise be used.

The invention claimed is:

1. An inductive shrinkage appliance comprising:
 a tool holder having a holding section with a central holding opening configured to hold a tool shank with a press fit;
 an induction coil arrangement concentrically surrounding the holding section; and
 an attenuating adaptor configured for insertion between the holding section of the tool holder and the induction coil arrangement, wherein the attenuating adaptor is in the form of a sleeve composed of non-ferromagnetic metal;
 wherein the induction coil arrangement is configured to provide a magnetic flux between the induction coil arrangement and the tool holder through the attenuating adaptor to thermally widen the central holding opening of the tool holder;
 wherein the attenuating adaptor is configured to be positioned within the inductive shrinkage appliance so that an inner circumferential surface of the attenuating adaptor is brought into contact with an outer circumferential surface of the holding section of the tool holder, with at least a portion of the inner circumferential surface of the attenuating adaptor being in flat touching contact with the outer circumferential surface of the holding section;
 wherein the inner circumferential surface of the attenuating adaptor includes a conical portion configured to contact at least the outer circumferential surface of the holding section;
 wherein the attenuating adaptor includes a plurality of slots passing radially through the attenuating adaptor alternately in the circumferential direction, starting from axially opposite ends of the attenuating adaptor, over at least a part of the axial length of the attenuating adaptor;
 wherein the attenuating adaptor includes a stop tab projecting radially inward at its axial end adjacent to an insertion side for the tool shank, wherein the stop is configured to position the attenuating adaptor axially at one end surface of the holding section; and
 wherein the induction coil arrangement comprises a stop adapted to axially position the induction coil arrangement with respect to an end surface of the attenuating adaptor.

2. The inductive shrinkage appliance of claim 1, wherein the attenuating adaptor includes a plurality of slots arranged diametrically opposite in pairs in the circumferential direction.

3. The inductive shrinkage appliance of claim 1, further comprising an annular cutout in at least one axial subsection of the inner circumferential surface of the attenuating adaptor.

4. The inductive shrinkage appliance of claim 1, wherein the attenuating adaptor is composed of a metal selected from the group consisting of copper, aluminum, and any combination thereof.

5. The inductive shrinkage appliance of claim 1, wherein the attenuating adaptor has an outer circumferential surface that is conical and that is configured to fit into a cooling collar.

6. An inductive shrinkage appliance comprising:
 a plurality of tool holders, each having a holding section with a central holding opening configured to hold a tool shank with a press fit; wherein the configuration of each of the plurality of tool holders is different from one another;
 an induction coil arrangement configured to concentrically surround the holding section of one of the plurality of tool holders when placed in an inductive shrinkage appliance;
 a plurality of attenuating adaptors, each attenuating adaptor being configured to be removably inserted between one of the plurality of tool holders and the induction coil arrangement;
 wherein the induction coil arrangement is configured to provide a magnetic flux between the induction coil arrangement and any one of the plurality of tool holders through the corresponding attenuating adaptor to thermally widen the central holding opening of the tool holder, wherein the induction coil arrangement is configured to accomplish the thermal widening using the same energy setting for each one of the plurality of tool holders; and
 wherein the attenuating adaptor includes a stop tab projecting radially inward at its axial end adjacent to an insertion side for the tool shank, wherein the stop tab is configured to position the attenuating adaptor axially at one end surface of the holding section.

7. The inductive shrinkage appliance of claim 6, wherein each of the plurality of attenuating adaptors has at least one of an external contour, an internal diameter of the holding opening, a wall thickness, number of slots, axial length of slots, widths of slots, and dimension of an annular cutout that differs from each of the other attenuating adaptors.

8. The inductive shrinkage appliance of claim 6, wherein each of the plurality of attenuating adaptors has an outer circumferential surface with the same contour and the same diameter as each of the other attenuating adaptors.

9. The inductive shrinkage appliance of claim 6, wherein the energy setting includes a level of alternating current delivered to the induction coil arrangement, the time interval at which the alternating current is fed to the induction coil arrangement, and the frequency of the alternating current.

* * * * *